United States Patent Office 3,333,230
Patented July 25, 1967

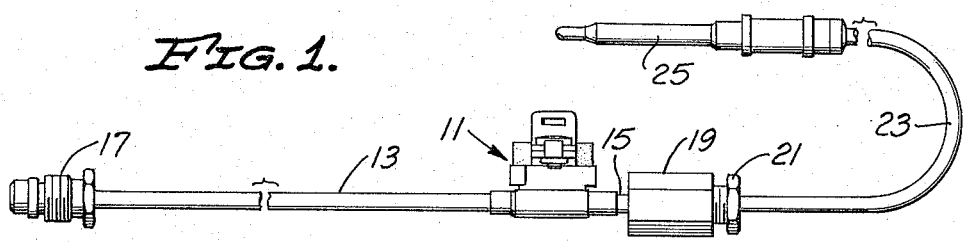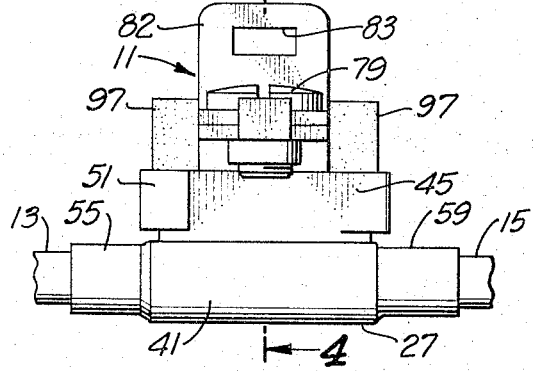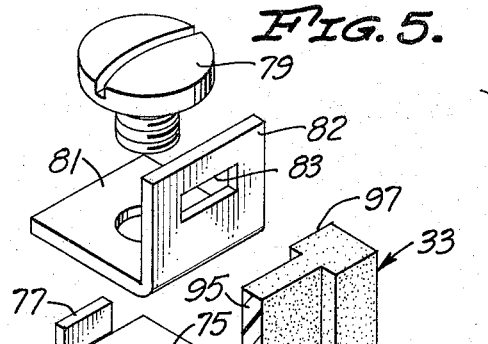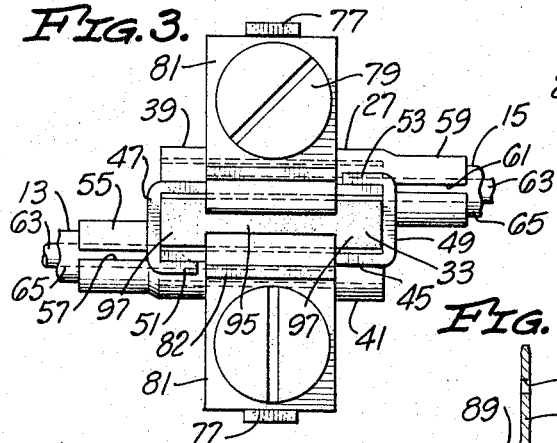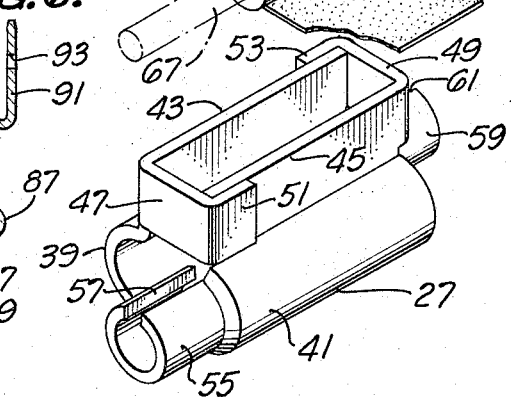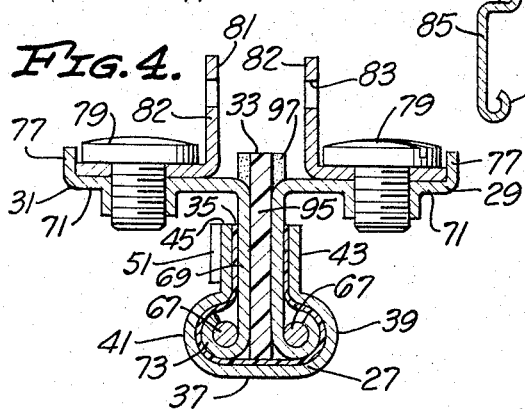

1

3,333,230
THERMOCOUPLE ADAPTER
Harold A. McIntosh, South Pasadena, and Houston Rehrig, Pasadena, Calif., assignors to Robertshaw Controls Company, Richmond, Va., a corporation of Delaware
Filed Dec. 3, 1964, Ser. No. 415,743
2 Claims. (Cl. 339—151)

ABSTRACT OF THE DISCLOSURE

An adapter for coupling a control device into the thermocouple line of a gas furnace. Two coaxial lines terminating in side-by-side alignment at a unitary metal housing, with the outer conductors fixed to the housing and with the inner conductors fixed to terminals insulated from each other and the housing and projecting outward from the housing.

---

This invention relates to thermocouple adapters for use in control circuits.

A thermocouple is frequently employed adjacent a pilot flame in a gas burner to produce a signal or voltage indicating that the pilot flame is burning properly. This voltage or signal is usually transmitted to a control circuit through a thermocouple line comprising internal and external coaxial conductors. If the pilot flame is extinguished, the thermocouple transmits no signal and the control circuit takes appropriate action such as shutting down the various burner components or not allowing the main gas valve to the main burner to be opened. It is frequently desirable for the control circuit to take similar action in response to other situations. For example, it is desirable to automatically shut down the main gas valve to the main burner of a clothes dryer when the clothes have been dried as indicated by the exhaust air temperature. To accomplish this, it is desirable to locate a cut-out switch in the exhaust air and so connect the cut-out switch to the thermocouple line that, when the cut-out switch is open, it will also open the circuit between the thermocouple and the control circuit.

Accordingly, it is an object of this invention to provide a thermocouple adapter adapted at each end for connection to a thermocouple line.

Another object of this invention is to provide a thermocouple adapter which is quickly and easily connected to a thermocouple line and to an external circuit.

Another object of this invention is to provide a thermocouple adapter that includes short sections of thermocouple line secured together in offset relationship.

A further object of this invention is to provide a thermocouple adapter that includes unitary means for securing together two short sections of thermocouple line, for electrically connecting one of the conductors in each thermocouple line, and for providing one terminal on each thermocouple line for connection to an external circuit.

Still another object of this invention is to provide a thermocouple adapter of simple construction which is easily fabricated.

Briefly stated, the invention includes two short sections of thermocouple line secured together adjacent one end by a unitary assembly which electrically connects one of the conductors of each section of thermocouple line and also provides one terminal on the other conductor of each thermocouple line. Means are also provided at the free ends of the short sections of thermocouple line for connecting them to other thermocouple lines. To use the adapter of the present invention, one end thereof is connected to the thermocouple line extending from the thermocouple and the other end thereof is connected to another section of thermocouple line leading to a control circuit. A cut-out switch or other appropriate circuitry may then be attached to the two terminals, which may take the form of plug-in prongs or screw terminals or a combination thereof.

The invention both as to its organization and method of operation, together with further objects and advantages thereof, may best be understood by reference to the following description taken in connection with the accompanying drawing. The drawing merely shows and the description merely describes preferred embodiments of the present invention which are given by way of illustration or example. The invention also comprises novel details of construction and novel combinations and arrangements of parts which will more fully appear in the course of the following description.

In the drawing:

FIG. 1 is a side elevation of the thermocouple adapter of the present invention connected to a thermocouple through a section of thermocouple line;

FIG. 2 is a side elevation showing the housing, terminals, and a portion of the insulation utilized in the thermocouple adapter;

FIG. 3 is a plan view of that portion of the thermocouple adapter shown in FIG. 2;

FIG. 4 is a sectional view taken along the line 4—4 in FIG. 2;

FIG. 5 is an exploded view showing all of the parts of the thermocouple adapter except the two short sections of thermocouple line; and FIG. 6 is a sectional view showing another form of terminal suitable for use with the thermocouple adapter of the present invention.

The thermocouple adapter of the present invention includes a unitary assembly 11 having end portions of thermocouple line 13 and another thermocouple line 15 secured therein. A threaded male connector 17 is suitably attached to thermocouple line 13 and a threaded female connector 19 is suitably attached to the thermocouple line 15. The thermocouple lines 13 and 15 may be of any suitable length, but short lengths of the order of a few inches are preferred. The male connector 17 is adapted to connect the thermocouple line 13 to another section of thermocouple line. The threaded female connector 19 is threadedly attached to a threaded male connector 21 which connects a thermocouple line 23 and a thermocouple 25 to the thermocouple adapter as shown in FIG. 1. Of course, the connectors 17 and 19 may be of any configuration suitable for connecting sections of thermocouple line.

The unitary assembly 11 includes a housing 27, a first terminal 29, a second terminal 31, electrical insulation 33 and electrical insulation 35. The housing 27 has a substantially flat bottom wall 37, rounded lower side walls 39 and 41, and flat upper side walls 43 and 45. The housing 27 is preferably formed from a single sheet of conductive metal and has an upper end wall 47 and an upper end wall 49 having portions 51 and 53 respectively which overlap the upper side walls. A substantially cylindrical, tubular extension 55 of somewhat smaller radius than the rounded lower side wall 41 and having a longitudinal slot 57 in the upper wall thereof extends longitudinally outwardly from the rounded lower side wall 41. A similar substantially cylindrical, tubular extension 59 having a longitudinal slot 61 extends longitudinally outwardly from the rounded lower side wall 39 at the other end of the housing. The extensions 55 and 59 are adapted to receive and hold within the housing the thermocouple lines 13 and 15 respectively. By placing one end of each thermocouple line within the extensions 55 and 59 and firmly squeezing each of the extensions with an appropriate tool, the width of the slots 57 and 61 is reduced so that the internal walls of the extensions firmly grip the ends of the thermocouple lines and provide an electrical connection therebetween. The joint may be soldered if desired.

The thermocouple line particularly adapted for use in this invention includes an internal conductor 63 and a hollow external conductor 65 which is coaxial with and surrounds the internal conductor. The internal conductor 63 and the external conductor 65 are insulated from each other by electrical insulation (not shown). The internal conductor 63 of each of the thermocouple lines 13 and 15 preferably extends longitudinally beyond the external conductor 65 within the housing 27 to form a protruding end portion 67.

The terminals 29 and 31 of the instant invention are preferably identical and formed from sheets of metal. The terminal 29 is bent substantially at its midpoint through an angle of approximately 90° to form a lower portion 69 and a flange 71. The lower portion 69 has a hook-shaped end 73 which partially surrounds and firmly grasps the extended conductor portion 67 and the flange 71 is provided with a threaded aperture 75 and an upwardly extending ear 77. Secured to the flange 71 by a screw 79 extending through the threaded aperture 75 is a conductive angle-shaped section 81 having an upwardly extending prong 82 with a rectangular opening 83 extending therethrough. The prong 82 is adapted to be plugged into a socket (not shown) leading to an external circuit. Alternatively, a conductor leading to an external circuit may be secured beneath the head of the screw 79, with or without the angle-shaped section 81, or may be secured in the rectangular opening 83. The other terminal 31 is identical to the terminal 29 and its corresponding parts are designated by corresponding reference numerals.

Alternate terminal structure is shown in FIG. 6. This terminal construction may be used in lieu of either or both of the terminals 29 and 31. FIG. 6 shows an integral terminal 85 having a hook-shaped end 87, an intermediate flange 89, and a prong 91 at the upper end thereof. The prong 91, which is adapted to be inserted into a socket leading to an external circuit, has a rectangular opening 93 passing therethrough. When employed in the thermocouple adapter of this invention, the hook-shaped end 87 of the integral terminal 85 partially surrounds and firmly grasps the protruding end portion 67 of one of the thermocouple lines. The intermediate flange 89 would be disposed just above the upper edge of the housing 27 and the prong 91 would extend upwardly in the same manner as the prong 82 of the terminal 29.

The assembled adapter is shown in FIG. 4. The hook-shaped ends 73 of the terminals 29 and 31 firmly grip the protruding end portions 67 of the internal conductors 63 of lines 13 and 15 and extend out of the upper portion of the housing 27 so that the prongs 82 are substantially parallel. The terminals are insulated from the housing by the electrical insulation 35 which lines the portion of the housing occupied by the terminals. The terminals 29 and 31 are spaced from each other at their lower portions 69 and insulated from each other by the electrical insulation 33. The insulation 33 has a web portion 95 and a flange portion 97 at each end of the web and extends from the insulation 35 at the bottom of the housing 27 to a point slightly above the flanges 71 of the terminals 29 and 31. The external conductors 65 are firmly held within the housing 27 by the substantially cylindrical extensions 55 and 59 which are tightened around the external conductors. It should be noted that the longitudinal axis of the cylindrical extension 55 is parallel to, and offset from the longitudinal axis of the cylindrical extension 59. Accordingly, the thermocouple lines 13 and 15 are held in overlapping, offset relationship as shown in FIG. 3. This construction provides for simple interconnection of the lines 13 and 15 without necessitating bending of any of the conductors.

With the thermocouple adapters so assembled, the conductive housing 27, which contacts both of the external conductors 65, serves to electrically connect these conductors. The housing 27 does not electrically connect the terminals 29 and 31 because of the insulation 35 which lines the interior portion of the housing 27 adjacent the lower portion 69 of the terminals. The protruding end portions 67 of the external conductors 65 are not electrically connected by the thermocouple adapter. Rather, the terminal 29 is attached by its hook-shaped end 73 to one of the protruding end portions 67 and the terminal 31 is attached to the other end portion 67 in a similar manner. Thus, there is no electrical connection between the internal conductors 63 except as may be provided by an external circuit which may be electrically connected to the terminals 29 and 31.

In utilizing the thermocouple adapter of the present invention, it is first secured to other thermocouple lines by the male connection 17 and the female connection 19. Then an appropriate external circuit such as one including a cutout switch may be quickly and easily connected to the terminals 29 and 31 as by pushing a socket over the prongs 82 or by attaching suitable conductors with the screws 79 or through the rectangular openings 83. The entire circuit is then ready for use.

Thus, the thermocouple adapter of the present invention provides a simple, yet efficient means for connecting a thermocouple line to an external circuit. The unitary assembly 11 of the thermocouple adapter performs many functions including securing the two sections of thermocouple lines 13 and 15 together in overlapping offset relationship, electrically connecting the external conductors 65 and providing external terminals connected to the internal conductors 63. The thermocouple adapter is also easily connected to another thermocouple line.

Although the housing 27 is preferably fabricated from a single sheet of conductive metal, it should be understood that the housing need only provide a conductive portion for electrically connecting the external conductors 65. Although the terminal forms shown are desirable, other terminal shapes may be used.

Although exemplary embodiments of the invention have been disclosed, it will be understood that other applications of the invention are possible, and that the embodiments disclosed may be subjected to various changes, modifications, and substitutions without necessarily departing from the spirit of the invention.

What is claimed is:
1. A thermocouple adapter for attachment to a thermocouple line comprising:
a first coaxial line having first inner and outer conductors;
a second coaxial line having second inner and outer conductors;
an electrical conducting housing having first and second sleeves at opposite ends of said housing defining parallel, spaced first and second passages, and a third sleeve defining a third passage disposed normal to said first and second passages,
with said first outer conductor terminating at one end in said first sleeve and with said second outer con- ductor terminating at one end in said second sleeve, and with said inner conductors projecting into said housing in parallel, spaced, side-by-side arrangement; and a sandwich assembly clamped in said third sleeve and comprising a first layer of insulation, a first terminal fixed to said first inner conductor, a second layer of insulation, a second terminal fixed to said second inner conductor, and a third layer of insulation, with said terminals projecting outward of said housing.

2. A device as defined in claim 1 in which said housing is a unitary piece of sheet metal and said first and third layers of insulation comprise a continuous strip of insulation positioned around said terminals separating said terminals from said housing.

References Cited

UNITED STATES PATENTS

| | | | |
|---|---|---|---|
| 1,643,659 | 9/1927 | Hillix | 339—155 X |
| 2,328,111 | 8/1943 | Thornberg | 174—75 |
| 2,605,314 | 7/1952 | Schelke | 339—150 |
| 2,836,640 | 5/1958 | Mueller | 136—228 |

MARVIN A. CHAMPION, *Primary Examiner.*

PATRICK A. CLIFFORD, *Examiner.*